Feb. 6, 1968  F. H. NOLL  3,367,067
HINGED COVER PLATE FOR HATCH COVER
Filed April 14, 1966  2 Sheets-Sheet 1
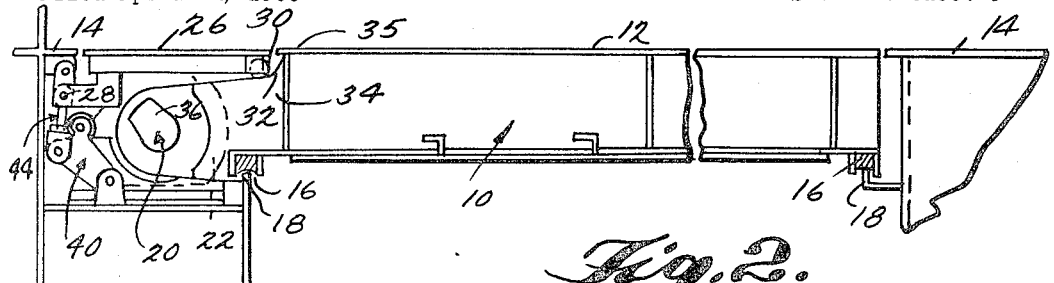
Fig. 2.
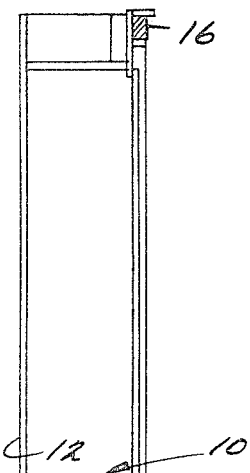
Fig. 1.
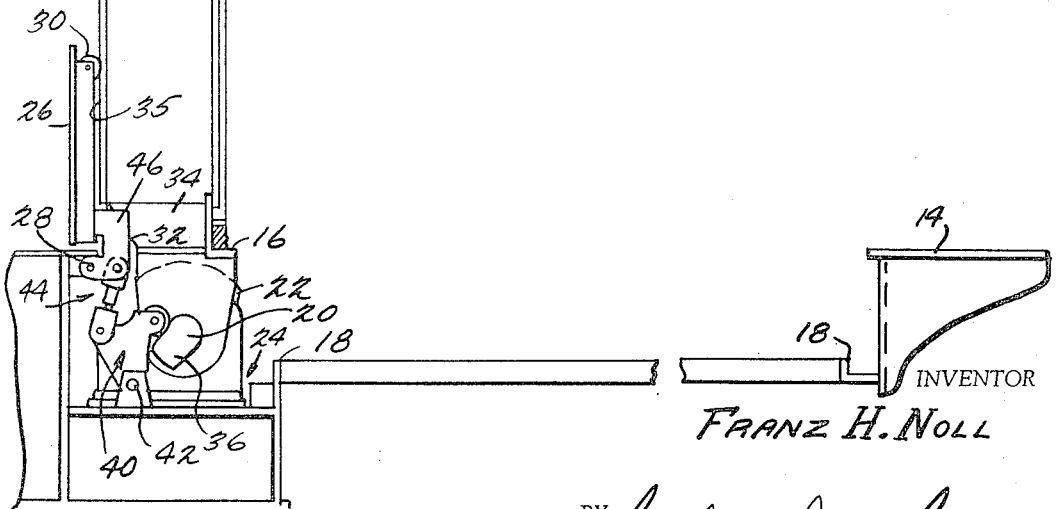
INVENTOR
FRANZ H. NOLL
BY Cushman, Darby & Cushman
ATTORNEYS

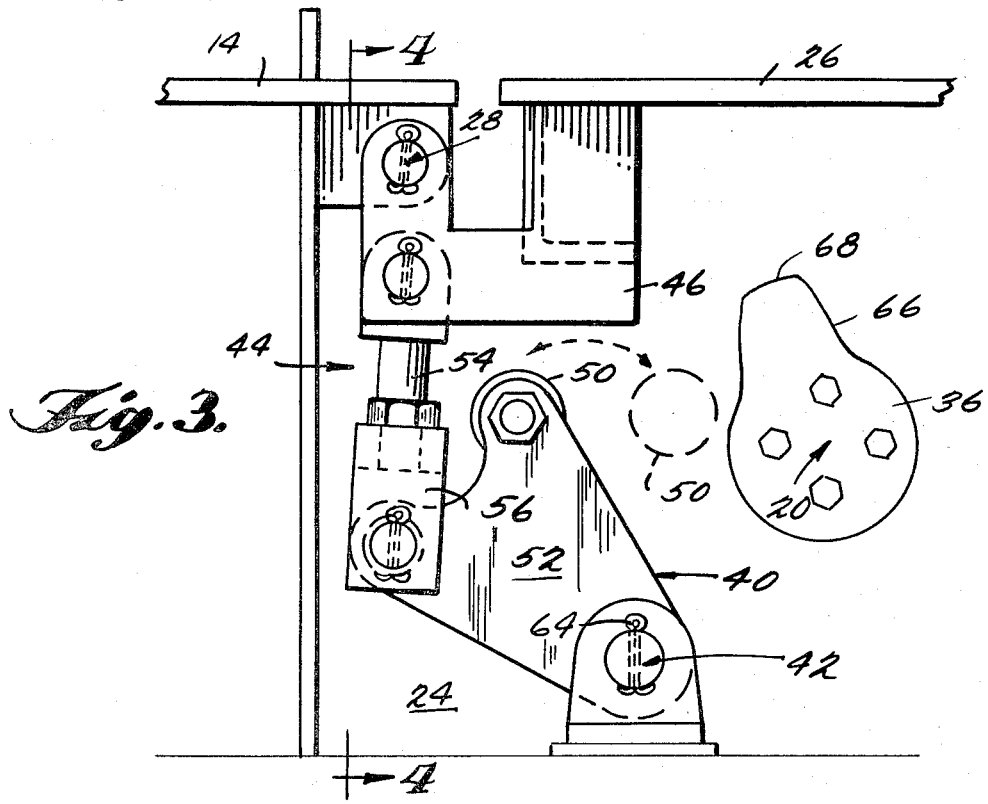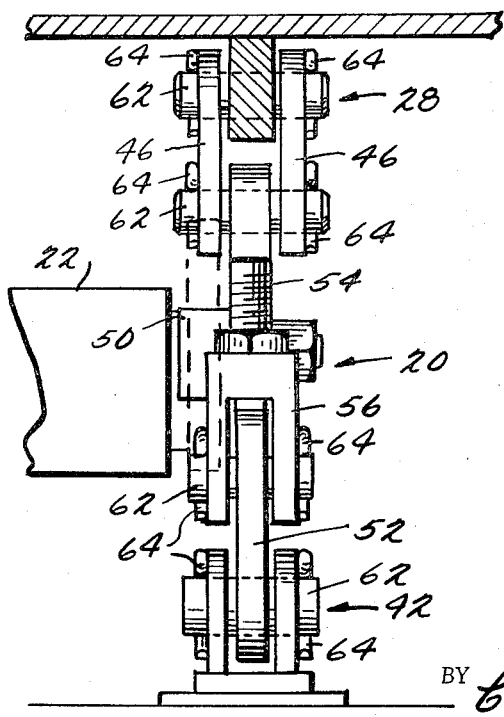

United States Patent Office 3,367,067
Patented Feb. 6, 1968

3,367,067
HINGED COVER PLATE FOR HATCH COVER
Franz H. Noll, Bremen-Oberneuland, Germany, assignor to Wiley Manufacturing Company, Port Deposit, Md., a corporation of Delaware
Filed Apr. 14, 1966, Ser. No. 542,540
6 Claims. (Cl. 49—98)

This invention relates to an improvement in a hatch cover arrangement of the type having a cover plate which cooperates with a hatch cover to cover a recess adjacent to the hatch cover. In particular, the invention is concerned with a means for closing the cover plate upon closure of the hatch cover.

In present-day hatch cover assemblies it is desirable to have a hatch cover which will be liquid tight when it is in a closed position, while at the same time presenting a smooth surface which is coplanar with adjoining deck surfaces. In order to obtain a smooth deck surface, it has been necessary to place the actuating mechanism for such a hatch cover at a below deck level, and the actuating mechanism is contained within a recess formed in the deck adjacent one end of the hatch cover. Since the actuating mechanism is closely associated with, or even a part of, the hinge means for the hatch cover, it is necessary for a portion of the hatch cover and its hinge to swing into and out of the adjoining recess as the hatch cover is moved about its pivotal axis to opened and closed positions. For this reason, any cover plate which is mounted over the recess must be opened upon an opening of the hatch cover. A cover plate of this type is described in the Kersteter et al. Patent 3,179,079, Apr. 20, 1965.

Although the use of cover plates has greatly improved hatch cover arrangements, there has been some difficulty in obtaining a positive closure of a cover plate upon closing and sealing an associated hatch cover. Prior arrangements have opened the cover plate in response to an opening of an associated hatch cover, but such plates have relied upon gravity to effect a closing of the cover plate upon a closing of the hatch cover. In some situations this has not been practical, and there ras been a failure of the cover plate to close in response to a closing of an associated hatch cover.

This invention provides for a positive closure of a cover plate which is associated with a hatch cover, and a closing movement of the hatch cover provides for a corresponding movement of the cover plate. In the hatch cover arrangement of this invention, there is provided a closing means in association with the hatch cover for actuating an adjoining cover plate into a closed position. The closing means may be in the form of a cam means which moves in response to a closing movement of the hatch cover, and the cam means is constructed to engage and displace a follower means carried by the cover plate. The follower means of the cover plate is pivotally mounted on a fixed axis and is connected to the cover plate through linkages which displace the cover plate from an open to a closed position upon displacement of the follower by a closing movement of the hatch cover. Thus, there is provided a positive closing movement for the cover plate without a mere reliance upon gravity.

The cam and follower means of this invention are further constructed to provide for a disengagement of the follower from the cam upon complete closure of the hatch cover. This feature permits the cover plates to be separately lifted by manual means for any necessary servicing of the hatch cover actuating mechanism without first unsealing and opening the hatch cover. This is especially important if the hatch cover actuating mechanism is inoperative and in need of servicing before the hatch cover can be opened.

Other features and advantages of this invention will become apparent in the more detailed discussion which follows, and in that discussion reference will be made to the accompanying drawings, in which:

FIGURE 1 is an elevational sectional view of a closed hatch cover and cover plate, and showing the closing means for the cover plate;

FIGURE 2 is a view similar to FIGURE 1, but showing a hatch cover and cover plate in open positions;

FIGURE 3 is a detailed side view of the closing means for the cover plate, and showing a cam and follower means used with the closing means; and FIGURE 4 is an end view of the detail shown in FIGURE 3.

FIGURES 1 and 2 show opened and closed positions, respectively, for a hatch cover and its associated cover plate. A hatch cover 10 is illustrated in the form of an oil tight hatch cover which closes to seal a tank in a marine vessel, and the upper surface 12 of the hatch cover is coplanar with adjoining deck structure 14 when the hatch cover is closed. The hatch cover is provided with gasket retainers 16 about the entire perimeter of its lower face, and gaskets held within the retainers 16 mate with compression bars 18 provided in appropriate places to engage and compress all of the gaskets carried by the hatch cover. Thus, when the hatch cover is closed, there is provided a tightly sealed closure which presents a coplanar surface with adjoining deck structure.

The hatch cover 10 is mounted for pivotal movement about an axis 20 which lies below the upper surface of the deck, and in this way, no hinge parts or other mounting devices project above the deck surface. The hatch cover may be mounted for pivotal movement in any suitable manner, but preferably power hinge devices 22 are used for mounting and actuating the hatch cover. Such power hinge devices are described in greater detail in Dunar Patent 3,127,817. Alternatively, the hatch cover 10 may be hinged and moved in accordance with the description of the Kersteter et al. Patent 3,179,079, owned by the assignees of this invention.

Since the pivotal axis for hinging the hatch cover is located at a level below the deck surface, it is necessary that a recess 24 be provided for containing mounting structure and other devices associated with the hinging and the actuation of the hatch cover. The recess 24 may be in the form of a shelf or other structure contained below the upper deck level and located along an edge of the hatch cover which is to be pivoted. In order to provide for an uninterrupted deck surface, a cover plate 26 is mounted for pivotal movement to open and cover the recess 24 in response to the opening and closing of the hatch cover 10. It will be appreciated that the raised hatch cover swings into some of the space normally covered by the cover plate, and therefore, structure is provided for moving the cover plate out of the way upon raising the hatch cover to an open position.

The cover plate 26 is hinged at 28 so that it can be raised to an upright position, as shown in FIGURE 1. The cover plate is raised by any suitable device which causes the plate to be lifted in response to a lifting of the hatch cover. In the illustrated embodiment the cover plate is lifted in direct response to a lifting of the hatch cover by an engagement of rollers or bearings 30 of the cover plate with a portion of the hatch cover. When the hatch cover is initially raised from a sealed position, the rollers or bearings 30 may roll along an inclined surface 32 of the hinge blades 34 of the hatch cover. The inclined surface 32 serves to ultimately lift the cover plate onto the upper surface 35 of the hatch cover and to the position shown in FIGURE 1.

Referring now to the closing mechanism associated with the hatch cover, it can be seen from the drawings that a cam 36 is carried by the hatch cover 10 for actuating and closing a cover plate 26 adjoining the hatch cover. The cam means 36 is rigidly fixed to a portion of the hatch cover so that the cam will be moved in accordance with pivotal movements of the hatch cover about its hinged axis. In the illustrated embodiment, the cam means 36 is attached to a hinge blade 34 of the hatch cover with the axis of rotation for the cam being common to the hinge axis 20 of pivotal movement for the hatch cover. Thus, when the hatch cover is swung about its hinge axis, there is a correspnding rotation of the cam means 36 about the same axis.

As shown in FIGURES 1 and 2, the cam means 36 has a surface configuration for engaging and displacing a follower means 40 associated with the cover plate 26, and the follower means is related to the cam means in such a way that the cam means engages the follower during closing movements of the hatch cover. As a result of this engagement, the cover plate is displaced through linkages connected to the follower, and there is a positive closing of the cover plate without a reliance upon gravity to effect the closing. From the position shown in FIGURE 1, and upon closing the hatch cover 10, it can be seen that the follower 40 will be swung to the left about its pivotal axis 42. The movement of the follower means 40 causes a linking member 44 to pull a cover plate hinge 46 about the pivotal axis 28 for the cover plate 26, and thus there is a closing of the cover plate upon closing the hatch cover.

FIGURES 3 and 4 illustrate the closing mechanism for the cover plate in greater detail, however, some of the structure has been omitted, for clarity. In FIGURE 3, the cover plate 26 is shown in a fully closed position which covers the recess 24, and the follower means 40 has swung its pivotal mounting point 42 to a position that removes a follower roller 50 out of engagement with the cam means 36. For this purpose the follower means 40 may be constructed to include a mounting plate 52 which carries the roller 50 and which serves as a means for carrying the roller 50 into and out of engagement with the cam 36. Connected to the mounting plate 52 is a linking member 44 which interconnects the mounting plate with the hinge 46 of the cover plate. The linking member 44 includes a threaded shank 54 which can be turned relative to a threaded receiving section in a forked portion 56, and in this way the length of the linking member can be adjusted. The linking member 44 is pivotally connected at its ends to a portion of the hinge 46 of the cover plate and to the mounting plate 52. The pivotal connections for the linking member 44 are shown in FIGURE 4, and it can be seen that all pivotal connections between all linking elements are formed by pins 62 inserted between the respective element which are to be connected. The pins 62 are held in place by cotter pins 64, or by any other suitable means. The cover plate hinge 46 is welded or otherwise fixed to the cover plate 26 and is mounted for pivotal movement about the point 28, as illustrated. Thus, there is provided a linking mechanism which can be actuated by a closing movement of an adjoining hatch cover and the linking elements which make up the mechanism are so related that the follower means 40 is disengaged from the cam means 36 upon complete closure of the hatch cover.

The feature of disengaging the follower means from the cam means is important where it may be necessary to separately open the cover plate 26 without first opening the closed hatch cover 10. Such a situation may develop when the cover plate 26 is required to be opened for servicing of any of the actuating devices associated with the cover plate or with the hatch cover. More importantly, the cover plate may have to be opened for a servicing or repair of the power hinge means which actuates the hatch cover 10 for opening and closing movements. In such a case the hatch cover may be closed and in an inoperative condition, and it would be necessary to open the cover plate 26 for servicing the inoperative hatch cover mechanism. FIGURE 3 shows the position of the follower roller 50 (with dotted lines) when the cover plate is separately opened. It can be seen that the follower remains out of engagement from the cam means 36 when the cover plate 26 is opened separately, and there is no interference with the separate opening movement of the cover plate.

Having described the structural features of the invention, the operation of the combined hatch cover and cover plate will be readily understood. From the position shown in FIGURE 1, the hatch cover may be closedy by applying a force to its particular hinge means, and where a power operated hinge is used suitable conduits and controls are provided for supplying hydraulic fluid to and from the power hinge means. The closing of the hatch cover may be effected in the manner described in either of the above mentioned patents. As the hatch cover closes, the cam means 36 is rotated with the closing movement of the hatch cover about its pivotal axis. The cam means 36 engages a follower means 40, as shown in FIGURE 1, and the follower is caused to move along a surface 66 of the cam during the initial closing movements of the hatch cover. The engagement of the cam means 36 with the follower means 40 causes a positive closing movement of the cover plate 26, and as the follower means reaches the end portion 68 of the cam means, there is a displacement of the entire follower assembly away from the cam means and in a direction that completes the closing movement for the cover plate 26. The final positions for the hatch cover and cover plate are shown in FIGURE 2.

Although this invention has been described with reference to a particular embodiment, it will be understood that variations can be made within the scope of the invention. Further, although the hatch cover and cover plate assembly have been described with reference to a flush mounted installation in a deck, it will be readily understood that the invention can be used with raised installations where a hatch cover and cover plate are placed over a cowling. These and other variations will become obvious to those skilled in the art, and all such variations are intended to be included within the scope of this invention.

The descriptions in the above mentioned patents are intended to be included as a part of the description of the present invention. The reference to other patents is made for the purpose of avoiding prolixity in the present description, and the material described in the above patents affords a more complete understanding of the present invention.

What is claimed is:

1. In a hatch cover assembly of the type having a hinged cover plate for covering a recess adjacent to the pivotal axis of the hatch cover and wherein said cover plate opens in response to an opening of the hatch cover, the improvement comprising:

closing means carried by said hatch cover and engageable with a portion of said cover plate for positively closing said cover plate upon closing said hatch cover, whereby said cover plate will be positively moved to a closed position without relying solely upon gravity.

2. The improvement of claim 1 wherein said closing means for said cover plate comprises a cam means carried by said hatch cover, said cam means being movable in response to movements of said hatch cover, and said cam means including a cam surface for engaging a follower means carried by said cover plate and for displacing said follower means and said cover plate upon closure of said hatch cover.

3. The improvement of claim 2 wherein said cam means is carried by said hatch cover for movement about the pivotal axis of said hatch cover.

4. The improvement of claim 2 wherein said follower means is mounted for movement about an axis separate from a pivotal axis for said cover plate hinge, and including means for moving said follower means completely out of engagement from said cam means upon complete closure of said hatch cover, whereby said cover plate means can be opened separately from said hatch cover.

5. The improvement of claim 4 wherein said follower means is linked to said cover plate for returning said follower to an engaged position relative to said cam means upon a complete opening of said hatch cover, whereby said follower means is in a position to be displaced by said cam means for closing said cover plate upon closing said hatch cover.

6. In a hatch cover arrangement for a liquid sealed hatch cover which is coplanar with the adjoining deck surface and wherein said hatch cover is opened and closed about a pivotal axis which is spaced below said deck surface, there being provided a recess adjacent to said hatch cover for containing actuating means which move said hatch cover about its pivotal axis, and including a cover plate for covering said recess when said hatch cover is closed, said cover plate being opened when said hatch cover is opened, the improvement comprising.

a closing means carried by said hatch cover for engaging and displacing a portion of said cover plate upon closure of said hatch cover whereby said cover plate is positively moved to a closed position over said recess when said hatch cover is closed, and including means for swinging said closing means out of engagement with said cover plate upon complete closure of said hatch cover, whereby said cover plate can be opened separately from the hatch cover and without interference from the closing means of the closed hatch cover.

References Cited
UNITED STATES PATENTS

| | | | |
|---|---|---|---|
| 2,725,003 | 11/1955 | Lyons | 114—201 X |
| 3,126,051 | 3/1964 | Sussin | 160—40 |
| 3,179,079 | 4/1965 | Kersteter et al. | 114—201 |

DAVID J. WILLIAMOWSKY, *Primary Examiner.*

J. K. BELL, *Assistant Examiner.*